United States Patent
Alagna et al.

(10) Patent No.: US 8,156,552 B2
(45) Date of Patent: *Apr. 10, 2012

(54) METHOD, COMPUTER SOFTWARE, AND SYSTEM FOR PROVIDING END TO END SECURITY PROTECTION OF AN ONLINE TRANSACTION

(75) Inventors: Michael Tony Alagna, Austin, TX (US); Mark Obrecht, Austin, TX (US); Andy Payne, Austin, TX (US); Peter Norwood, Austin, TX (US)

(73) Assignee: Symantec Corporation, Mountain View, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 12/029,098

(22) Filed: Feb. 11, 2008

(65) Prior Publication Data

US 2008/0209561 A1     Aug. 28, 2008

Related U.S. Application Data

(63) Continuation of application No. 10/357,868, filed on Feb. 4, 2003, now Pat. No. 7,331,062, which is a continuation-in-part of application No. 10/231,557, filed on Aug. 30, 2002, now Pat. No. 7,748,039.

(51) Int. Cl.
    *G06F 11/00* (2006.01)
    *G06F 11/30* (2006.01)

(52) U.S. Cl. .......................................... 726/22; 713/188

(58) Field of Classification Search .............. 726/22–25; 713/164, 187, 188; 705/51, 52
    See application file for complete search history.

(56) References Cited

U.S. PATENT DOCUMENTS

| | | |
|---|---|---|
| 5,121,345 A | 6/1992 | Lentz |
| 5,440,723 A | 8/1995 | Arnold et al. |
| 5,537,540 A | 7/1996 | Miller et al. |
| 5,802,277 A | 9/1998 | Cowlard |
| 5,919,257 A | 7/1999 | Trostle |
| 5,956,481 A | 9/1999 | Walsh et al. |
| 5,960,170 A | 9/1999 | Chen et al. |
| 6,006,328 A * | 12/1999 | Drake .............................. 726/23 |

(Continued)

FOREIGN PATENT DOCUMENTS

WO      99/00720 A     1/1999

(Continued)

OTHER PUBLICATIONS

Veldman, "Combating Viruses Heuristically", Virus Bulletin Conference, Virus Bulletin Ltd., Abington, GB, Sep. 1993.

(Continued)

*Primary Examiner* — Nathan Flynn
*Assistant Examiner* — Abdullah Almamun
(74) *Attorney, Agent, or Firm* — Meyertons, Hood, Kivlin, Kowert & Goetzel, P.C.; Dean M. Munyon

(57) ABSTRACT

A method for implementing an online transaction security product includes downloading an online transaction security product program from a web site to an information handling system. The security product program includes an anti-malicious code program configured to detect malicious code on the information handling system. Lastly, the security product program is executed, wherein the anti-malicious code program of the security product program operates to detect malicious code on the information handling system.

20 Claims, 3 Drawing Sheets

U.S. PATENT DOCUMENTS

| | | | |
|---|---|---|---|
| 6,088,804 | A | 7/2000 | Hill et al. |
| 6,182,227 | B1 | 1/2001 | Blair et al. |
| 6,266,774 | B1 | 7/2001 | Sampath et al. |
| 6,269,456 | B1 | 7/2001 | Hodges et al. |
| 6,272,641 | B1 | 8/2001 | Ji |
| 6,275,937 | B1 * | 8/2001 | Hailpern et al. .............. 713/188 |
| 6,298,445 | B1 | 10/2001 | Shostack et al. |
| 6,324,538 | B1 * | 11/2001 | Wesinger et al. ..................... 1/1 |
| 6,330,588 | B1 | 12/2001 | Freeman |
| 6,347,375 | B1 | 2/2002 | Reinert et al. |
| 6,357,008 | B1 | 3/2002 | Nachenberg |
| 6,393,568 | B1 | 5/2002 | Ranger et al. |
| 6,477,651 | B1 | 11/2002 | Teal |
| 6,523,120 | B1 | 2/2003 | Strasnick |
| 6,671,812 | B1 | 12/2003 | Balasubramaniam et al. |
| 6,725,377 | B1 * | 4/2004 | Kouznetsov ..................... 726/23 |
| 6,772,346 | B1 * | 8/2004 | Chess et al. ..................... 716/13 |
| 6,775,780 | B1 | 8/2004 | Muttik |
| 6,792,543 | B2 | 9/2004 | Pak et al. |
| 6,836,272 | B2 | 12/2004 | Leung et al. |
| 6,842,861 | B1 | 1/2005 | Cox et al. |
| 6,873,966 | B2 | 3/2005 | Babbitt et al. |
| 7,010,698 | B2 | 3/2006 | Sheymov |
| 7,162,649 | B1 * | 1/2007 | Ide et al. ....................... 713/165 |
| 7,165,174 | B1 | 1/2007 | Ginter et al. |
| 7,174,566 | B2 | 2/2007 | Yadav |
| 7,228,434 | B2 * | 6/2007 | Zisowski ....................... 713/187 |
| 7,237,265 | B2 * | 6/2007 | Reshef et al. .................. 726/25 |
| 2002/0019767 | A1 | 2/2002 | Babbitt et al. |
| 2002/0066024 | A1 | 5/2002 | Schmall et al. |
| 2002/0150243 | A1 | 10/2002 | Craft et al. |
| 2003/0051026 | A1 * | 3/2003 | Carter et al. .................. 709/224 |
| 2003/0069928 | A1 * | 4/2003 | Hidesawa ..................... 709/203 |
| 2003/0159070 | A1 | 8/2003 | Mayer et al. |
| 2003/0177397 | A1 | 9/2003 | Samman |
| 2003/0234808 | A1 | 12/2003 | Huang et al. |
| 2004/0054917 | A1 | 3/2004 | Obrecht et al. |
| 2004/0064736 | A1 | 4/2004 | Obrecht et al. |
| 2004/0098607 | A1 | 5/2004 | Alagna et al. |
| 2004/0123157 | A1 | 6/2004 | Alagna et al. |
| 2004/0187023 | A1 | 9/2004 | Alagna et al. |
| 2004/0266533 | A1 * | 12/2004 | Gentles et al. .................. 463/42 |
| 2005/0137980 | A1 | 6/2005 | Bullock et al. |

FOREIGN PATENT DOCUMENTS

| | | |
|---|---|---|
| WO | 99/50734 A | 10/1999 |
| WO | 02/03178 | 1/2002 |
| WO | 02/095553 | 11/2002 |
| WO | 02/103533 | 12/2002 |
| WO | 2004/021197 | 3/2004 |
| WO | 2004/055632 | 7/2004 |
| WO | 2004/072777 | 8/2004 |

OTHER PUBLICATIONS

Nachenberg, Carey, "Behavior Blocking: The Next Step in Anti-Virus Protection," http://www.securityfocus.com/infocus/1557, retrieved Jul. 25, 2007, pp. 1-5, XP002444153.

"Automated Program Analysis for Computer Virus Detection," IBM Technical Disclosure Bulletin, IBM Corp., New York, US, vol. 34, No. 2, Jul. 1, 1991, pp. 415-416, XP000211158, ISSN: 0018-8689.

Supplemental European Search Report mailed Aug. 6, 2007, cited in European Application No. 03791906.5.

International search report application No. 04707408.3 mailed Mar. 2, 2007.

Office Action of Dec. 8, 2006, in U.S. Appl. No. 10/768,862, 11 pages.

Communication Pursuant to Article 94(3) EPC in Application No. EP 04 707 408.3 issued Jun. 2, 2008, 6 pages.

PCT Search Report, PCT No. PCT/US01/17275, Jan. 10, 2002, 4 pages.

Summons in application 04707408.3-1245 / 1590723 mailed Apr. 16, 2010.

* cited by examiner

METHOD, COMPUTER SOFTWARE, AND SYSTEM FOR PROVIDING END TO END SECURITY PROTECTION OF AN ONLINE TRANSACTION

The present application is a continuation of U.S. patent application Ser. No. 10/357,868, filed Feb. 4, 2003 now U.S. Pat. No. 7,331,062, which is a continuation-in-part of U.S. patent application Ser. No. 10/231,557, filed Aug. 30, 2002 now U.S. Pat. No. 7,748,039, both of which are incorporated by reference in the present application in their entireties.

BACKGROUND

The present disclosure relates generally to information handling systems, and more particularly to a method, computer software, and system for providing online security protection against identity theft and fraud, hereinafter referred to as Online Theft, during an online transaction with an information handling system. When a user goes to a web site to perform an online transaction, the user is asked to provide personal identification information and personal financial information. Hackers use Trojan Horses ("Trojans") to steal this information from the user. The hacker can then use this information to commit theft or fraud against the user, usually an individual or small business initiating the transaction, or against the organization hosting the transaction. This disclosure presents a method, computer software, and system that can be provided to users so that they and the companies they do business with are automatically protected from this form of Online Theft.

The disclosure is novel because it protects users at the very moment of risk to Online Theft and it protects them automatically without the users having to install software, configure software or perform complex operations to protect themselves. An online transaction must be protected throughout the different portions of the network that are used to complete it. While there currently exist adequate measures to protect the enterprise hosting the transaction and to protect the network traffic between the end user and the enterprise, there are not adequate security measures to protect the end user's system from being compromised by a hacker seeking to perform Online Theft. The disclosure is significant because it provides the last portion of protection required to secure an online transaction.

To date, online transactions are secured at the enterprise server by a variety of enterprise security measures such as firewalls and Network Intrusion Detection Systems. These security measures protect the information handling system initiating the transaction, hereinafter referred to as the client computer, from hackers who have compromised the various web servers, application servers or database servers used to execute the transaction. The online transaction is also protected as it traverses the network by end to end encryption. Encryption protects the user from hackers who might capture the messages sent back and forth across the network by tapping into the systems and links that are used to connect the user's computer to the enterprise hosting the transaction. But the weak link in protecting an online transaction has been the lack of adequate security at the endpoint, i.e. at the client computer where the online transaction is initiated. The present disclosure provides security at the endpoint by detecting Trojan Horses that are used by hackers to infect the endpoint. The endpoint is protected automatically whenever a user initiates an online transaction in which the user discloses confidential information that could subject to Online Theft. The present disclosure thereby ensures end to end online transaction security.

Trojan Horses ("Trojans") are a particular type of malicious code. Malicious code is code that executes on an information handling system, typically a computer, but it can also be a Personal Digital Assistant or other information handling device, and is intended to damage the computer, secretly collect information from the computer, alter the computer without the permission of the computer's user, or use the computer against the wishes of the computer's user. The Trojan horse is executable code that can exist in one of many forms. For example, some but not all of the forms that Trojans can be instantiated in executable code are as one or more programs, threads inside other programs, plugins or shared modules loaded by other programs, or modules loaded into operating system kernel memory in the manner of a device driver or loadable kernel module. A Trojan is a form of malicious code that enables a person to remotely control someone else's computer. The person who remotely controls the computer is hereinafter referred to as the "Evil Hacker" or simply the "hacker" while the person whose computer is being remotely controlled is hereinafter referred to as the "Innocent Victim". BackOrifice2000, SubSeven, NetBus and OptixPro are all examples of Trojans. Trojans are sometimes referred to as "back-doors" or "hacker back-doors."

Most Trojans have two components, the client program (Trojan Client) that is run on the Evil Hacker's computer and the server program Trojan Server) that is run on the Innocent Victim's computer. Some Trojans have only a Trojan Server that can be remotely controlled through manually entered commands rather than through the programmatic interface of a Trojan Client.

There are many ways to infect a computer with a Trojan including sending the Innocent Victim the Trojan Server disguised as a valid program, copying the Trojan Server onto the Innocent Victim's computer, or exploiting a vulnerability in the Innocent Victim's computer to place the Trojan Server on the computer.

A Trojan Horse is a tool that hackers frequently use to perform Online Theft. In order to perform an online transaction, a user must go to a particular web site, hereinafter referred to as the Transaction Portal, where the transaction is hosted. The user must then identify himself. This is typically done through a login procedure in which the user enters his username and password. If the transaction involves financial payment, then the user must also provide other personal financial information. Even if the user does not enter in additional financial or personal information, this information may be sent from the server performing the transaction to the end user so that it can then be seen by a hacker.

If the innocent victim computer is performing such an online financial transaction, the evil hacker can use the Trojan Horse to capture the username and password of the innocent victim or any other confidential personal or financial data. Once the username and password are known to the evil hacker (identity theft), the hacker can log in from the innocent victim's computer or any other computer and transfer funds from the innocent victim's account (financial theft) and it will appear as though the transaction is a valid one. If the user has provided personal financial information such as a credit card number, then the hacker can also perform financial theft and fraud by using this information elsewhere.

Also, the evil hacker can simply remotely control the innocent victim's computer during the online banking session without reusing the username and password by taking over the session and performing a seemingly valid transaction from the innocent victim's computer. Another way for the evil hacker to commit fraud is for the hacker to login from a completely different system while using the identity of the innocent victim, and using the information gathered by the Trojan Horse, to perform a transaction from that system.

Anti-Trojan programs that are intended to prevent Trojans used for Online Theft may have previously been installed on the innocent victim's computer. Nevertheless, even if the anti-Trojan program has been installed previously, the parties to the transaction cannot be certain that the program is still working at the time the transaction is executed. Therefore, to protect the parties involved in the transaction, it is necessary to ensure that a method for detecting malicious code used for Online Theft is available at the time the transaction is executed.

Accordingly, it is desirable to provide an improved method for detecting Trojans in a computer system whenever a user about to perform an online transaction and is, therefore, at risk of online theft.

SUMMARY

According to one embodiment, a method for implementing an online transaction security product includes downloading an online transaction security product program from a web site to a browser operating on an information handling system. The transaction security product program is hosted on the Transaction Portal and is downloaded in order to protect the client computer at the time that the parties to the transaction are at risk of Online Theft. The anti-malicious code program is configured to detect malicious code on the information handling system. The anti-malicious code program operates to detect malicious code and to remove it from the information handling system. The removal of the malicious code reduces or eliminates the ability of an evil hacker to use the malicious code to perform Online Theft. The detection and removal of the malicious code takes place either immediately before the login sequence, immediately after the login sequence or during the time period in which the transaction is being performed. Computer-readable media and an information handling system are also disclosed.

DETAILED DESCRIPTION

The Environment

The present disclosure protects both parties to an online transaction from Online Theft. The first party is the enterprise that is hosting the transaction. The enterprise provides a Transaction Portal, or simply Portal, that consists of an Internet web site with an Internet server. The Internet web site allows users to log in to through the Portal to gain access to the web site in order to execute transactions. The Portal can provide access to Intranet users or to Internet users. For the purposes of the present disclosure it doesn't matter if the Portal supports users over an Intranet or an Internet, so we will hereinafter refer to the Portal as a Portal to the Internet.

The user has a computer that we refer to as the client machine. The client machine is executing an Internet Browser, referred to hereinafter as simply a browser, that is used to access the Internet. The user can navigate to the Portal and log in to the web site that the enterprise hosts. Multiple users can simultaneously access the Portal.

An evil hacker has another computer that is connected to the Internet. The evil hacker can infect the user's client machine with a Trojan Horse. When the client machine is infected we refer to the infected user as the Innocent Victim.

Figure 1:
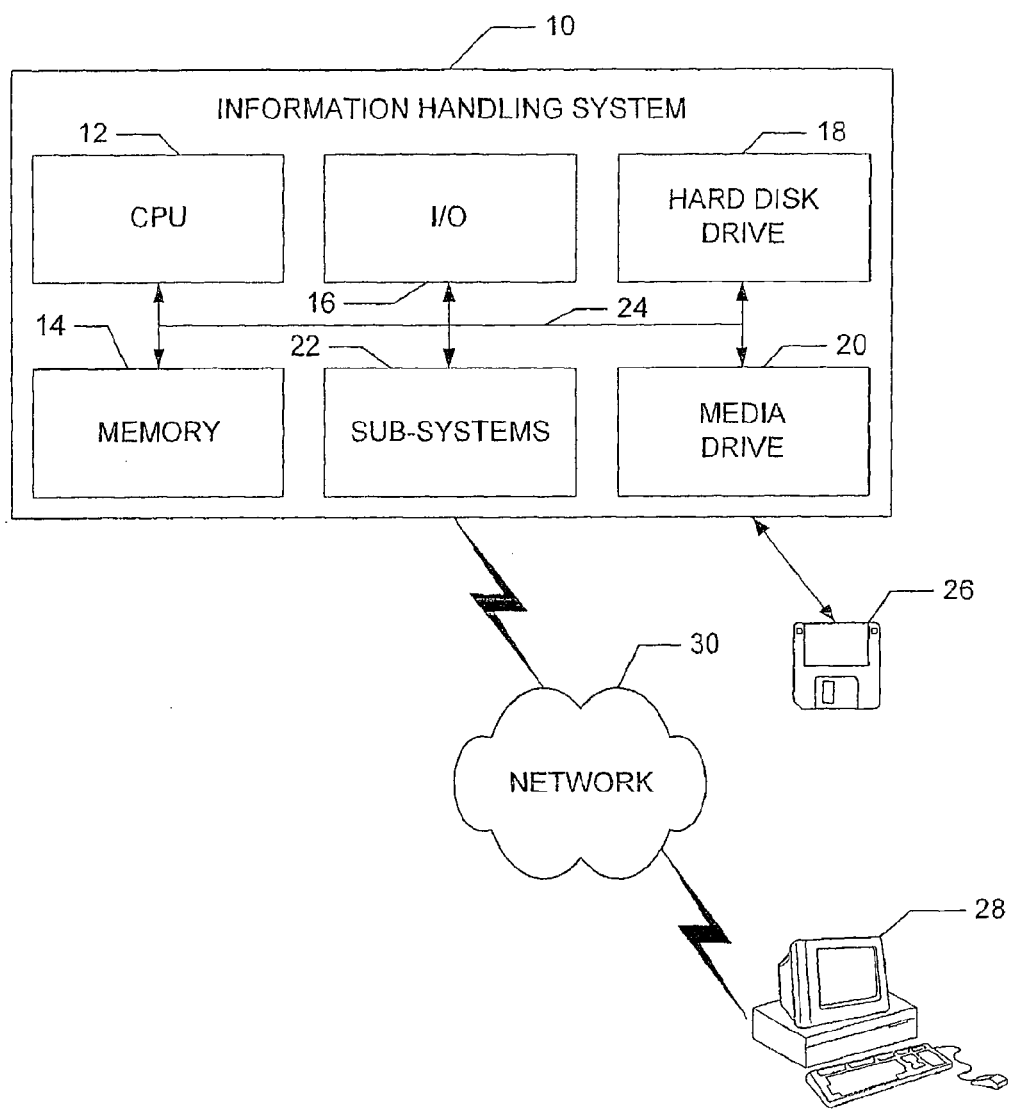
FIG. 1 is a system block diagram of an information handling system for implementation of the method of detecting a Trojan according to one embodiment of the present disclosure.

In FIG. 1, a system block diagram of an information handling system 10 for implementing the method of providing online security protection according to one embodiment of the present disclosure is shown. Information handling system 10 includes one or more of: a central processing unit (CPU) 12, memory 14, input/output (I/O) devices, such as a display, a keyboard, a mouse, and associated controllers, collectively designated by a reference numeral 16, a hard disk drive 18, or other storage devices or media drives, such as may include a floppy disk drive, a CD-ROM drive, a DVD drive, and the like, collectively designated by a reference numeral 20, or various other subsystems, such as a network interface card, wireless communication link, etc, collectively designated by a reference numeral 22, all interconnected, for example, via one or more buses, shown collectively as a bus 24. Examples of an information handling system may include a computer system, a personal digital assistant, a thin client device, a thick client device, or similar information handling device.

In one embodiment, information handling system (IHS) 10 is configured with a suitable operating system to install and run executable code, programs, etc., from one or more computer readable media 26, such as a floppy disk, CD-ROM, DVD, or the like. Information handling system 10 may further be configured for communicating with another information handling system 28, for example, through a network 30 via a suitable communication link or links. The operating system of IHS 10 may also be configured to install and run programs, download data, etc., via network 30. The illustrative embodiments of the present disclosure may be practiced over an Intranet, the Internet, virtual private network, or other suitable communication network.

Trojan Detection and Mitigation Program

According to one embodiment, the method of providing online security protection is implemented in the form of computer software, the computer software comprising instructions executable by the CPU of a computer system, for example, an Innocent Victim's computer system. The instructions include suitable program code processable by the computer system for performing the various functions as described herein. The various functions as discussed herein can be programmed using programming techniques well known in the art.

One method for detecting Trojans includes detecting a server portion of a Trojan residing on a target computer system, for example, an innocent victim computer system. The method also identifies the server portion of the Trojan when the server portion is executing on the target computer. As briefly discussed above, most Trojans have two components, a client program (Trojan Client) that is run on an Evil Hacker's computer and the server program (Trojan Server) that is run on the Innocent Victim's computer.

Accordingly, a method of detecting a Trojan includes a procedure for detecting a Trojan Server, i.e. the portion of a Trojan that resides on the Innocent Victim's computer system. The procedure can be embodied in a computer program, for example, a Trojan detection program. The Trojan detection program detects the presence of a Trojan while it is executing on a computer.

Figure 2:
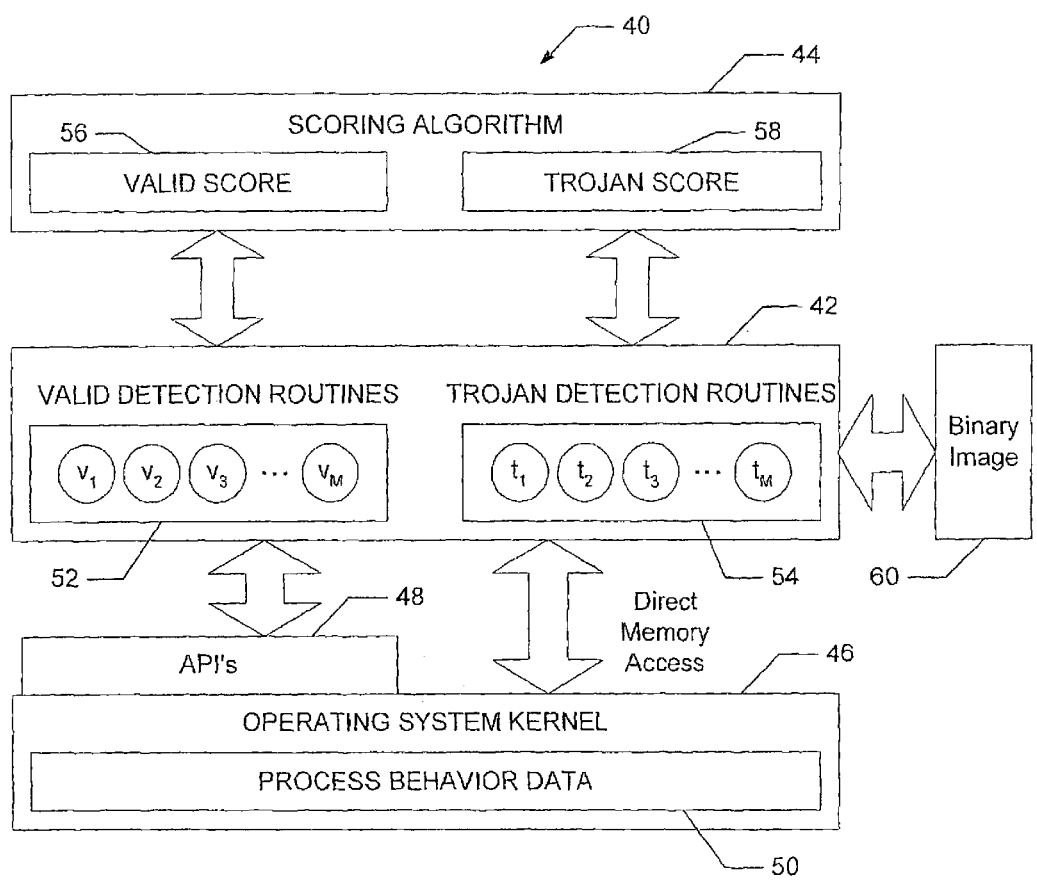
FIG. 2 illustrates a detection architecture of a Trojan detection program according to one embodiment of the present disclosure.

FIG. 2 illustrates an architecture of a Trojan detection program 40 according to an embodiment of the present disclosure. The Trojan detection program 40 includes detection routines 42 and a scoring algorithm 44. The detection routines 42 operatively couple to the operating system kernel 46 of the computer system under investigation via application programming interfaces (APIs) 48. The detection routines also access process behavior data 50 and binary image data 60, according to the particular requirements of a corresponding detection routine, further as discussed below.

In one embodiment, the Trojan detection program is configured to operate as required for a given security application. For example, the Trojan detection program can be configured to execute at any time, on an as-needed basis, a periodic basis, a random basis, another scheduled basis, or on an event driven basis in response to a particular event according to the particular requirements of the security application. When the Trojan detection program executes, it examines the characteristics and behaviors of all computer programs that are executing at the current time on the subject computer system. The Trojan detection program evaluates each computer program that is running on the computer system under investigation, to determine whether the running computer program is a valid program or a Trojan.

The Trojan detection program 40 contains detection routines 42, including valid program detection routines 52 and Trojan detection routines 54. The valid program detection routines 52 include one or more routines identified by v1, v2, v3, . . . , vM in FIG. 2. The valid program detection routines 52 are configured to determine whether the program under investigation has characteristics and behaviors usually associated with a valid program. The Trojan detection routines 54 include one or more routines identified by t1, t2, t3, . . . , tN in FIG. 2. The Trojan detection routines 54 are configured to determine whether the program under investigation has characteristics and behaviors usually associated with a Trojan.

In one embodiment, the valid program detection routines 52 and the Trojan detection routines 54 are configured to gather information about each program under investigation by examining the program itself and by looking for information about the program in the operating system 46. The detection routines 42 access information from the operating system 46 using application programming interfaces (APIs) 48 to the operating system. The API's 48 can include documented API's, undocumented API's, direct access to resources of the computer or information handling system such as memory or network connections, or kernel or device driver interfacing. The detection routines 42 gather information from the program itself by examining one or more of a binary image of the program that is stored in memory, a binary image of the program that is stored on disk or other media, the characteristics and behavior of the program, and any other related programs (such as libraries used by the program under investigation), represented by reference numerals 50 and 60 in FIG. 2.

For example, a detection routine 42 can be configured to take into account the following. Many Trojans log keystrokes on the Innocent Victim's computer and transmit the keystroke data from the Innocent Victim's computer to the Evil Hacker's computer. In one embodiment, a Trojan detection routine 54 determines whether or not the program being examined is logging keystrokes. Since there are many different ways for a program to log keystrokes, one or more of the Trojan detection routines 54 can be configured to examine the program under investigation to determine whether the program is using any of a number of different mechanisms for logging keystrokes.

The Trojan detection program 40 further includes a scoring algorithm 44. The scoring algorithm calculates two scores—a valid program score 56 and a Trojan score 58. If the result of a valid program detection routine 52 indicates that the characteristic or behavior of the program being examined was that of a valid program, then a weight, Wi, is associated with the routine and that weight contributes positively to the valid program score 56. A weight, Wi, is assigned to each valid program detection routine, for i=1 to M, where M is the number of valid program detection routines.

If the result of a Trojan detection routine 54 indicates that the characteristic or behavior of the program being examined was that of a Trojan, then a weight, Wj, is associated with the routine and that weight contributes positively to the Trojan score 58. A weight, Wj, is assigned each Trojan detection routine, for j=1 to N, where N is the number of Trojan detection routines.

According to one embodiment, the scoring algorithm 44 comprises an algorithm that includes an algebraic formula for determining the two scores 56 and 58. The scoring algorithm is dependent on the valid program detection routines 52 and the weights, Wi, associated with each valid program detection routine, in addition to, the Trojan detection routines 54 and the weights Wj, associated with each Trojan detection routine. The algebraic formula or equation can also be made arbitrarily complex, for example, to include associating weights to one or more to combinations of detection routines 42.

In one embodiment, the scoring algorithm 44 includes an algebraic equation defined as a sum of weighted values. For example, the algebraic equation for the valid program detection routines can include an equation as given by:

$$VALIDSCORE = \sum_{i=1}^{M} W_i,$$

where Wi=weight of a valid detection routine vi for i=1 to M.

Similarly, the algebraic equation for the Trojan detection routines can include an equation as given by:

$$TROJANSCORE = \sum_{j=1}^{N} W_j$$

where Wj=weight of a Trojan detection routine tj for j=1 to N.

In another embodiment, more complex forms of the scoring algorithm 44 can be implemented in the form of more sophisticated algebraic formulae.

If a program under investigation exceeds a valid program score threshold, $V_{thres}$, then it is determined that the program is a valid program. If that program exceeds a Trojan score threshold, $T_{thres}$, then it is determined that the program is a Trojan program. If a program is deemed to be valid using the valid algorithm, then it is sometimes removed from consideration from additional Trojan score routines.

Executable code and/or programs under investigation may also have some of the characteristics and behaviors of valid programs and some of the characteristics and behaviors of Trojans. If a program does not exceed either threshold or if a program does not have a significant difference between the valid program score 56 and the Trojan score 58, then according to another embodiment of the present disclosure, the method identifies the program in another category of Suspicious Programs or Anomalous Programs.

In one embodiment, the method for detecting malicious code on a computer system includes executing a malicious code detection program on the computer system. The malicious code detection program includes detection routines. The malicious code detection program applies the detection routines to programs running on the computer system during the execution of the malicious code detection program. The detection routines are assigned weights that are factored by a scoring algorithm to determine a composite score based on the results of the detection routines and their associated weights. For example, a malicious code detection routine has a weight associated with it, such that if the malicious code detection routine determines that a given code under investigation is a Trojan, then the weight is applied positively towards the malicious code score for the code under investigation. Lastly, the malicious code detection program determines whether one or more programs of all programs running on the computer system during operation of the malicious code detection program is a valid program or malicious code as a function of the weights assigned to the detection routines.

In another embodiment, the method is configured to detect malicious code in the form of a Trojan horse on a computer having an operating system. The method includes executing a malicious code detection program on the computer. Detection routines of the malicious code detection program are configured to gather information about programs running on the computer during execution of the malicious code detection program. The detection routines include at least one selected from the group consisting of a) examining each executable code or program itself and b) searching for information about each executable code or program in the operating system. For example, examining code or a program can include examining a binary image of the same, wherever the binary image may reside, within the IHS or in computer readable media accessible to the IHS. In addition, the detection routines further consist of valid program detection routines and malicious code detection routines.

The malicious code detection program applies the detection routines to the programs running on the computer. In response to a detection of a valid program or malicious code, the detection routines assigns weights to respective programs under test as a function of a respective detection routine. Lastly, the malicious code detection program determines whether a program is a valid program or malicious code as a function of the weights assigned by the detection routines. Determining whether the program is a valid program or malicious code involves the scoring of an execution of each detection routine as a function of a respective weight. A scoring algorithm is used to identify a program as malicious code in response to a valid score and a malicious code score, as discussed herein.

In yet another embodiment, the method for detecting malicious code on a computer system includes executing detection routines, the detection routines having been configured to examine at least one selected from the group consisting of characteristics and behaviors of programs running on the computer system. For example, the detection routines can be configured to access process behavior data of a program running on the computer system. In addition, the characteristics and behaviors may include one or more of logging keystrokes, saving a display screen view, uploading files, downloading files, running programs, and controlling a display screen of the computer system.

Subsequent to execution of one or more of the detection routines, weights are assigned as a function of the examined characteristics and behaviors, the assigned weights indicative of a valid program or malicious code as a function of respective detection routines. Lastly, the method determines whether a program is malicious code as a function of the weights assigned by the detection routines.

In the embodiment of the previous paragraph, the detection routines include valid program detection routines and malicious code detection routines. The valid program detection routines are configured to determine whether the program exhibits at least one or more characteristics and behaviors associated with a valid program. The malicious code detection routines are configured to determine whether the program exhibits at least one or more characteristics and behaviors associated with malicious code.

In one embodiment, the method of detecting Trojans is carried out in the form of a computer program. The computer program is executed on a desired computer system for detecting any potential Trojans present on the computer system. Execution of the computer program continues until all active programs on the computer system have been tested and evaluated. Alternatively, other criteria may be established for a duration of testing with the Trojan detection program. For example, execution of the malicious code detection program can be configured to occur in response to one or more of a random initiation and a periodic initiation.

According to another embodiment, the Trojan detection program comprises a small program configured for being delivered quickly, as well as, for being executed quickly. The Trojan detection program can be delivered to the innocent victim's computer over a network, such as a Local Area Network (LAN), Wide Area Network (WAN), Internet, intranet, or any other global computer network 30. The Trojan detection program may also be delivered via suitable computer readable media, such as, media 26 shown in FIG. 1.

While not stopping an infection of the computer system with Trojans, the methods of the present embodiments include identifying a Trojan when executing on a computer system. The method of identifying a Trojan could be combined with other methods, for example, a method for detecting infection, resulting in a more robust computer system malicious code protection implementation.

Procedure for Detecting and Mitigating Malicious Code Used for Online Theft

A method of providing online security protection will now be described in connection with FIG. 3. The method for providing online security protection includes downloading an anti-malicious code program from a web server to a user's information handling system terminal. In one embodiment, the anti-malicious code program includes an anti-Trojan Program. For example, the anti-Trojan Program may include a Trojan detection program having a scoring algorithm, detection routines, and application behavior data collection as discussed herein above. The anti-Trojan program further includes a program for performing mitigation actions and an unquarantine program. The mitigation actions include at least one of disabling and quarantine of the malicious code detected by the Trojan detection program. The unquarantine program provides additional functionality for reversing the quarantine of code previously detected by the Trojan detection program as malicious code, as discussed further herein.

Figure 3:
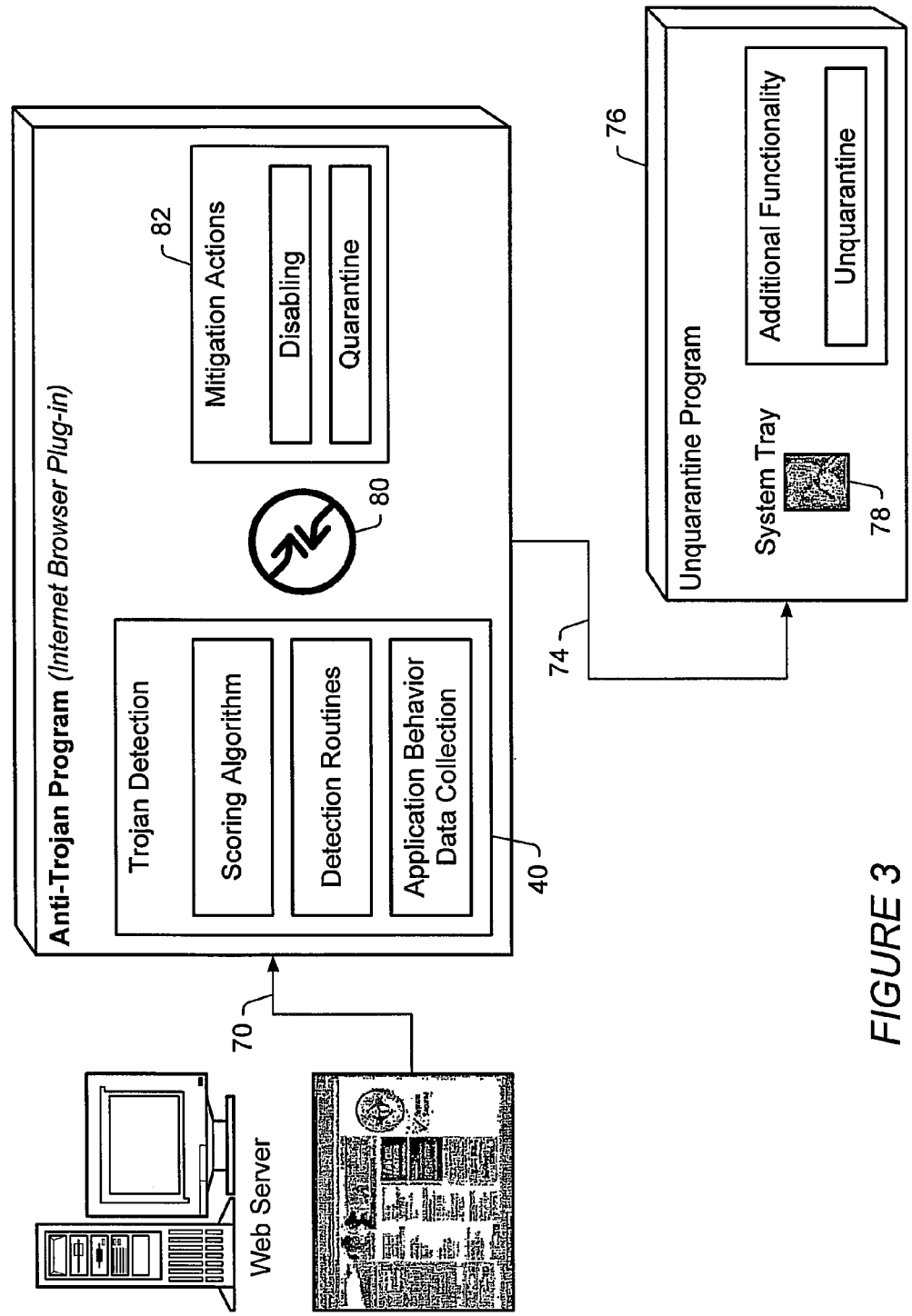
FIG. 3 is a block diagram view of online security protection according to another embodiment of the present disclosure.

In FIG. 3, at 70, the anti-Trojan program 72 is downloaded from a given web page of a web site configured to host the online security protection. In one embodiment, the anti-Trojan program includes a plug-in that is downloaded a first time, thereafter it is cached and runs in the context of the browser operating on the user's system. At 74, the plug-in installs an unquarantine program 76 on the user's system and adds a system tray icon 78. At 80, the plug-in 74 runs the detection technology contained therein and then performs one or more mitigation functions/actions 82 in response to finding a Trojan.

According to another embodiment, the online security protection method includes protecting users of online transactions from identity theft and fraud via Trojan Horse detection technology.

According to yet another embodiment, the online security protection method includes distributing a security technology configured to protect an online user, in response to accessing a web site, and for which the online user is about to perform a critical transaction that would benefit from a higher level of security.

In another embodiment, the online security protection method provides for distribution of a security technology including technology for detection of Trojan Horses. The method is also applicable to future security products that could be distributed in a similar manner, e.g. a firewall, a detection technology for other forms of malicious code, etc.

The method of the present embodiments provides protection for a user of an online transaction from Trojan Horses and therefore provides protection against identity theft and fraud from hackers using Trojan Horses. According to one embodiment, the method protects the innocent victim by detecting and removing Trojan Horses at the point of entry into the online financial transaction. By detecting and removing the Trojan Horse at the point of entry to the online financial transaction, such as the login sequence to an online bank website, the innocent victim is assured that his session cannot be remotely controlled. In addition, the method includes suggested measures for organizing an online banking session so that an online banking customer user can make sure that the username and password are secure, if a Trojan Horse was active at the time of the login to the online banking session. In one embodiment, the online transaction security protection method employs Trojan Horse detection and removal technology, hereafter called the anti-Trojan program, as described herein. The anti-Trojan program is activated immediately prior to or after the login sequence. If the anti-Trojan program is initiated immediately prior to the login sequence, then the Trojan can be removed before the username and password entered during the login sequence are compromised. If the anti-Trojan program is activated immediately after the login sequence, then the Trojan can be removed after the username and password have been compromised but the user can be prompted to change their password at that point in time. This reduces the window of vulnerability and helps to protect the user from an evil hacker who may have just captured the user's username and password.

According to another embodiment of the present disclosure, the method for providing online security protection of an online transaction does not require that the anti-Trojan program is run at the point of entry to the online web site, e.g., the financial web site. That is, the online security protection measures can be run at any point during the online session. Furthermore, it is sometimes desirable to run the anti-Trojan program repeatedly during the lifetime of the online financial transaction session. Running the anti-Trojan program repeatedly during the lifetime of the online financial transaction session guards against a Trojan infection that could occur after the login sequence and before the end of the session. Running the anti-Trojan program repeatedly or even continuously reduces the probability that a Trojan infection can occur that would compromise confidential information.

It should be noted that the online financial transaction may include any number of online financial transactions, including inquiries relating to account balance, transaction history, etc. relating to one or more financial transactions. Therefore, the current embodiment includes the ability to run the anti-Trojan program repeatedly or continuously during the session. Running the program continuously can be done by launching the anti-Trojan program on an event driven basis. One embodiment of the present disclosure provides for triggering the anti-Trojan program to be run every time that a new program is started on the innocent victim's computer. By triggering the startup of the anti-Trojan program on a new process being started, the anti-Trojan will be able to detect any new Trojans that are started during the session.

Unique aspects of the embodiments of the present disclosure include the way in which the security product program is distributed, i.e. packaged and delivered, as well as how the security product program is integrated into the online financial transaction system.

Integration into the Online Financial Transaction Procedure

In the following discussion, the method shall be described in connection with an example company X, wherein company X hosts a web site for handling online transactions, such as online financial transactions. The process is as follows:

1. Start at company X's online login page.
    a. It should be noted that starting at the company's login page is a likely scenario, but not a requirement. There are many ways to determine if a user is a customer of Company X other than waiting for the user to login with a valid account username and password. For instance, the method can include leaving a cookie on the user's information handling system and checking the cookie via the anti-Trojan plug-in to validate the user. Therefore, the session that is being described does not necessarily need to be started at the user's login page. Nevertheless, this is probably going to be the most common way for the technology to be integrated into a company's web site.
2. User logs in. This assures that the anti-Trojan program can only be made available to company X's online customers.
3. User is directed to the page where the anti-Trojan program is hosted.
4. At this point, the institution can choose an opt-in/opt-out model or they can force the user into the security procedure. The opt-in/opt-out model gives the user the choice to accept the anti-Trojan program thereby "opting-in" or to refuse to accept the download of the anti-Trojan program, thereby "opting-out" In the opt-in/opt-out scenario, the User is presented with a prompt asking the User to accept or reject the anti-Trojan program. An example of a prompt that a user would receive might include: "Do you trust content from 'Company X'" or "Do you want to install and run Y". User clicks "OK" or "Cancel".
    i. OK: go to next step (go to step 5)
    ii. Cancel (this depends on the company's policy):
        1. skips the download and redirects the user to a page on the online financial company X's web site that normally follows the login page.
        2. the user is forced to download the plug-in in order to proceed with the session. (go to step 5)
        3. The user is prohibited from entering the portion of the web site that enables the user to perform a transaction.

If the institution has chosen to force the User to run the anti-Trojan program, then the User is not prompted to make a choice. In this case, the User is simply forced to go to the next step (go to step 5).

5. The user's information handling system automatically downloads the anti-Trojan program. In one embodiment, the program is somewhat specific to the particular operating system and the specific Internet browser of the user's information handling system. That is, some operating systems and browsers can execute the same program, while some operating systems and browsers need a version that is specific to them. According to another embodiment, the download is preceded by a separate download of a program that identifies the operating system and the type of internet browser being used on the user's information handling system so that it can initiate a download of the correct version of the anti-Trojan program.
6. Once the anti-Trojan program is downloaded, it executes. At some point during the execution, the anti-Trojan program installs a resident program on the innocent victim's computer and optionally a shortcut (e.g. a system tray icon on a computer running Windows® OS) so that the user can invoke the resident program at a later time. A further discussion of the resident program and its purpose is presented herein below. When the anti-Trojan program executes, the program detects any Trojans on the user's computer. There are several ways in which the anti-Trojan can be configured:
   a. If no Trojan is found, then the user is redirected to a web page that allows them to proceed normally with the online transaction session.
   b. If a Trojan is found, then there are several procedures that can be followed depending on a security protection policy of the company:
      i. The Trojan is simply detected:
         1. The user can be notified that a Trojan was discovered.
         2. The user's session can be terminated so as not to allow the user to continue with the session since it might have been compromised.
      ii. The Trojan can be detected and also Disabled:
         1. Disabling means that the Trojan process is 'killed'.
         2. Disabling is a useful means of removing the Trojan from the machine during the session. This is useful because some applications behave like Trojans but the user may want to keep them on the machine. An example of this is PCAnywhere which is a legitimate remote system administration tool. It may be wise, depending on company policy, to prohibit the running of such an application during an online transaction session and yet to leave it on the innocent victim's system for future use.
      iii. The Trojan can be detected, Disabled, and also Quarantined:
         1. Quarantining means that the Trojan application on the disk drive is identified and it is moved and changed so that it cannot be started again at a later time or date (i.e., respawned).
         2. Quarantining can include Cleaning, which refers to the process of removing all vestiges of the Trojan from the innocent victim's system (e.g., including Microsoft Registry entries, associated files, etc.).
7. When execution of the anti-Trojan program completes, the user may be notified of the status of the "scan", e.g. a notification that no Trojan was found or a notification that a Trojan was found and removed.
8. Depending on the security policy of the company:
   a. The anti-Trojan program redirects the user to a page that allows the user to proceed with the online transaction.
   b. The anti-Trojan program prevents the user from proceeding with the online transaction if a Trojan was found. In addition, the program can cause the user to be logged out or be asked to contact customer support.
   c. The anti-Trojan program redirects the user to a page that encourages (or forces) the user to change their password and/or username. In this instance, changing the user password and/or username is done since the Trojan scan occurred after the user logged in and so the username and password may have been compromised.
9. The anti-Trojan program also makes available a resident program configured so that the user may Unquarantine a program that has been Quarantined. Unquarantine reverses the operation of the Quarantine action and restores the corresponding program to its original location on disk. The resident program can also include other functionalities such as the ability to provide additional information on the Trojans detected, the ability to view help or contact a support organization, etc. However, a primary purpose of the resident program is to provide the ability to Unquarantine what has been Quarantined. There are at least two reasons why the user may wish to perform an Unquarantine operation.
   a. The anti-Trojan program may have mistakenly identified a valid application as a Trojan Horse and that program may have been automatically Quarantined. In this event, the user may want to restore the valid program. In fact, it is possible that the act of Quarantining a valid program may have disconnected the computer from the network (if the valid application was an application needed for network communications). This is the reason that the Unquarantine function is made available in a resident agent rather than in the same or another plug-in which would require network connectivity.
   b. The anti-Trojan program may have identified a legitimate Trojan Horse and the user may want to restore that Trojan Horse for some reason. For example, the Trojan Horse may be a legitimate remote administration tool, for example, such as PCAnywhere.

Distribution Method

According to one embodiment, the method for providing online security protection includes distributing a security product, and more particularly, a particular method for packaging and delivering the anti-Trojan program to an online user's information handling system. In one example, the anti-Trojan program is packaged as a web browser plug-in.

Currently, there exist several different Internet browsers that are commonly used to access the Internet from a computer. These browsers include Microsoft's Internet Explorer (IE), Netscape's Netscape browser and America Online's AOL Browser. All of these browsers use plug-ins to dynamically add code to the browser to enhance the respective browser's functionality. The plug-ins are packaged in a way that is well defined for the particular browser.

When the browser accesses a web-site where the online security plug-in is stored (i.e., hosted), the plug-in downloads and is added to the browser to enhance the browser's capabilities with the on-line security protection measures. Internet Explorer implements plug-ins as ActiveX controls. Netscape refers to plug-ins as Netscape plug-ins. AOL uses both, the ActiveX controls for older AOL browsers and the Netscape plug-ins for their newer browsers.

Plug-ins, by their nature, are designed to be automatically downloaded when a user accesses a particular web page. ActiveX controls use a single dialog that the user must interact with in order to accept and install the plug-in. Netscape plug-ins use different installers that use one or more dialogs to install the plug-in. Once the plug-in is downloaded and installed, the plug-in is cached on the end-user's system and is activated whenever the user returns to the same web site.

According to one embodiment of the present disclosure, the method of providing online security includes restructuring the online financial session so that a web site user is directed to a page immediately prior to or during the online financial transaction that will load the online security protection download and install the anti-Trojan program plug-in at the appropriate point during the transaction or session. Once the plug-in has been downloaded, the user can also be protected by executing or running the anti-Trojan program thereafter on the user's machine, for example, either periodically, continuously, or some combination thereof.

According to one embodiment of the present disclosure, the plug-in can be verified when it is started to determine whether or not it has been tampered with. This is important since the anti-Trojan plug-in is intended to guard against malicious code and the malicious code may attempt to defend itself by altering the anti-Trojan plug-in. There are numerous techniques for determining whether or not the anti-Trojan program has been tampered with.

A user could also be protected by running the anti-Trojan plug-in prior to the login sequence of the online financial transaction or banking session. Such a deployment of the anti-Trojan plug-in would render the anti-Trojan protection available to all those users who might simply be browsing rather than to the specific customers who have valid logins on a particular financial institution's web site. However, there are other ways to determine if the user is a member of the web site besides waiting for the user to login to the web site, e.g. cookies left on the user's system when they register. Therefore, the specific page on which the anti-Trojan plug-in is hosted and the time during the sequence when the plug-in is downloaded depend upon the policy of the company hosting the transaction. By developing a specific procedure, such as discussed herein below, the financial institution can protect all of its customers when the customers visit the financial institution's web site. Accordingly, the financial institution can thus provide a value added service.

In another embodiment of the present disclosure the anti-Trojan program is an executable program. The procedure is very similar to the procedure followed with a plug-in. One difference is that while the plug-in executes within the context of the Internet browser, the executable program does not. Another difference is that while the plug-in is cached automatically so that it does not have to be downloaded after the first download, the executable program must either be written so that it remains in memory or it must depend upon the operating system to cache the program.

Benefits of the Present Disclosure

The method of online security protection of an online transaction as discussed herein provides at least several key benefits that are unique. These benefits include single-click security, universal compliance, and continual reassurance. Each benefit is listed herein below with further elaboration on the method of the present disclosures.

With respect to the benefit of single-click security, most security products require a great deal of user interaction and knowledge for the user to properly configure and use them. The method of the present disclosures allows the security product, such as the anti-Trojan program, to be used with virtually no user knowledge or interaction of the security product itself. The method of the present embodiments simplifies the user's interaction by requiring a single "click". For example, the method includes asking a user once during an online session if the user wishes to download the anti-Trojan program. Upon acceptance of the download, the method allows the security product to work automatically to protect the user.

With respect to universal compliance, most security software products have to be installed by the user and then they have to be updated periodically. If a compact disk (CD) with a security product on it is mailed to a million users, only a small percentage of those users will install it and use it. The online security product of the present disclosure is "automatically" distributed and installed by the user during an online transaction session at a company web site. As a result, all users of the particular company web site desiring to perform one or more online transactions are protected.

With respect to a continual reassurance, users can be periodically and/or continually reminded, for example, via a security emblem or icon or other suitable means, that they are being protected by the online transaction security protection product embodiments of the present disclosure. Accordingly, the method continually reassures users and provides a marketing advantage over other non-protected online transaction providers.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A non-transitory computer-readable medium storing program instructions executable on a computing device to:
   at the point of entry into a transaction over a wide-area network via a first website, run a malicious code detection program, wherein running the malicious code detection program includes:
      executing a plurality of routines;
      using results of the plurality of routines to detect whether malicious code is executing on the computing device;
   repeatedly re-run the malicious code detection program during the transaction, wherein each re-running of the malicious code detection include re-executing the plurality of routines; and
   upon malicious code being detected by the malicious code detection program, provide an indication to a user of the computing device that malicious code has been detected.

2. The non-transitory computer-readable medium of claim 1, wherein the malicious code detection program is executable within a browser application as a plug-in, and wherein the transaction is an Internet-based banking transaction.

3. The non-transitory computer-readable medium of claim 1, wherein the program instructions are executable to discontinue the transaction upon detecting malicious code executing on the computing device.

4. The non-transitory computer-readable medium of claim 1, wherein the program instructions are executable to disable or quarantine the malicious code that is detected, and then continue the transaction.

5. The non-transitory computer-readable medium of claim 1, wherein the point of entry into the transaction is prior to a login sequence to the first website.

6. The non-transitory computer-readable medium of claim 1, wherein the point of entry into the transaction is immediately after entry of a login sequence to the first website.

7. The non-transitory computer-readable medium of claim 1, wherein the program instructions are executable to continue the transaction after prompting the user to change login information associated with the first website and receiving the changed login information.

8. The non-transitory computer-readable medium of claim 1, wherein the malicious code detection program is executable to determine, for one of a plurality of programs executing on the computing device, a first composite score indicative of code characteristics and/or behaviors typically associated with valid code, and a second composite score indicative of code characteristics and/or behaviors typically associated with malicious code.

9. The non-transitory computer-readable medium of claim 8, wherein the first composite score is calculated based on weighted output values of a first plurality of valid code detection routines, and wherein the second composite score is calculated based on weighted output values of a second plurality of malicious code detection routines, and wherein the program instructions are executable to determine whether to continue the transaction based on at least one of the first and second composite scores.

10. The non-transitory computer-readable medium of claim 1, wherein the malicious code detection program is executable to analyze one of a plurality of programs running on the computing device to determine whether the analyzed program is malicious.

11. A non-transitory computer-readable medium storing program instructions executable on a computing device to facilitate performing a transaction via a first website to:
  repeatedly re-run a malicious code detection program throughout the duration of the online transaction, wherein re-running the malicious code detection program includes:
    executing a plurality of routines;
    using results of the plurality of routines to determine whether malicious code is running on the computing device; and
  upon the malicious code detection program determining that malicious code is running on the computing device, terminate the online transaction.

12. The non-transitory computer-readable medium of claim 11, wherein the online transaction is an Internet-based banking transaction to facilitate performing the first website.

13. The non-transitory computer-readable medium of claim 12, wherein the program instructions are executable to determine whether malicious code is running on the computing device by:
  calculating, for each active program running on the computing device, a first composite score indicative of the likelihood of the active program being valid code and a second composite score indicative of the likelihood of the active program being malicious code; and
  using the first and second composite scores for each active program to determine whether that program is malicious code.

14. The non-transitory computer-readable medium of claim 11, wherein the malicious code detection program is executable to analyze one of a plurality of programs running on the computing device to determine whether the analyzed program is malicious.

15. A non-transitory computer-readable medium storing program instructions executable on a computing device to facilitate performing a transaction via a first website to:
  repeatedly re-run a malicious code detection program during the online transaction, wherein re-running the malicious code detection program includes:
    executing a plurality of routines;
    using results of the plurality of routines to determine whether malicious code is running on the computing device; and
  upon the malicious code detection program determining that malicious code is running on the computing device, suspend the online transaction until the malicious code is disabled.

16. The non-transitory computer-readable medium of claim 15, wherein the program instructions are executable to disable malicious code by quarantining the malicious code.

17. The non-transitory computer-readable medium of claim 15, wherein the malicious code detection program is executable within a browser application as a plug-in to disable the malicious code at least during the duration of the online transaction.

18. The non-transitory computer-readable medium of claim 15, wherein the malicious code detection program is executable to calculate, for programs running on the computing device, valid scores and malicious scores indicative of valid and malicious characteristics and/or behaviors, respectively, and wherein the program instructions are executable to determine whether to suspend the online transaction based on at least one of the calculated valid and malicious scores.

19. The non-transitory computer-readable medium of claim 15, wherein the program instructions are executable to receive the plurality of routines from a server at the point of entry into or during the online transaction.

20. The non-transitory computer-readable medium of claim 15, wherein the plurality of routines include a first set of routines executable to determine whether active programs on the computing device possess characteristics and/or behaviors indicative of valid code, and wherein the plurality of routines include a second set of routines executable to determine whether active programs on the computing device possess characteristics and/or behaviors indicative of malicious code, and wherein the program instructions are executable to determine whether to suspend the online transaction based on results of at least one of the first and second sets of routines.

* * * * *